United States Patent [19]

Neuman

[11] Patent Number: 4,854,499
[45] Date of Patent: Aug. 8, 1989

[54] TEMPERATURE SENSITIVE SHOWER DIVERTER VALVE AND METHOD FOR DIVERTING SHOWER WATER

[76] Inventor: Eli Neuman, 6 Massada Street, Magdiel, Israel

[21] Appl. No.: 47,697

[22] Filed: May 8, 1987

Related U.S. Application Data

[63] Continuation of Ser. No. 807,861, Dec. 11, 1985, abandoned.

[51] Int. Cl.[4] .............................................. G05D 23/00
[52] U.S. Cl. .................................... 236/93 B; 4/192; 137/624.2
[58] Field of Search ............... 236/93 B, 12.12, 12.13; 4/192, 596; 251/129.01; 137/624.2

[56] References Cited

U.S. PATENT DOCUMENTS

| | | | |
|---|---|---|---|
| 1,978,623 | 10/1934 | Clifford | 236/93 B |
| 3,989,066 | 11/1976 | Sturman et al. | 137/624.2 |
| 4,563,780 | 1/1986 | Pollack | 4/192 |

Primary Examiner—William E. Wayner
Attorney, Agent, or Firm—Freilich Hornbaker Rosen & Fernandez

[57] ABSTRACT

A temperature sensitive shower diverter valve and method for diverting shower water used between a source of shower water and a shower head to control the flow of water to the shower head. The diverter valve is positioned between the wall outlet pipe and the shower head. The valve has an inlet port connected to the outlet pipe, a first outlet port connected to the shower head, and a second outlet port for diverting the water to a wall or a corner of the shower. A temperature sensitive directing means directs the water entering the inlet port to the first outlet port when the temperature of the water is within a range between first and second temperatures for use by the bather and diverts the water to the second outlet port when the temperature of the water is outside of the range. The diverting valve automatically resets when water having a satisfactory temperature returns. An electrical embodiment uses a temperature sensor and a microprocessor to control a rotary valve. One non-electrical embodiment uses two bimetallic disks for sensing the water temperature to mechanically seal off ports to direct the water. Another non-electrical embodiment utilizes two bimetallic disks in a fluidic valve having a water jet to control the jet by allowing a vacuum to be created on one side.

10 Claims, 5 Drawing Sheets

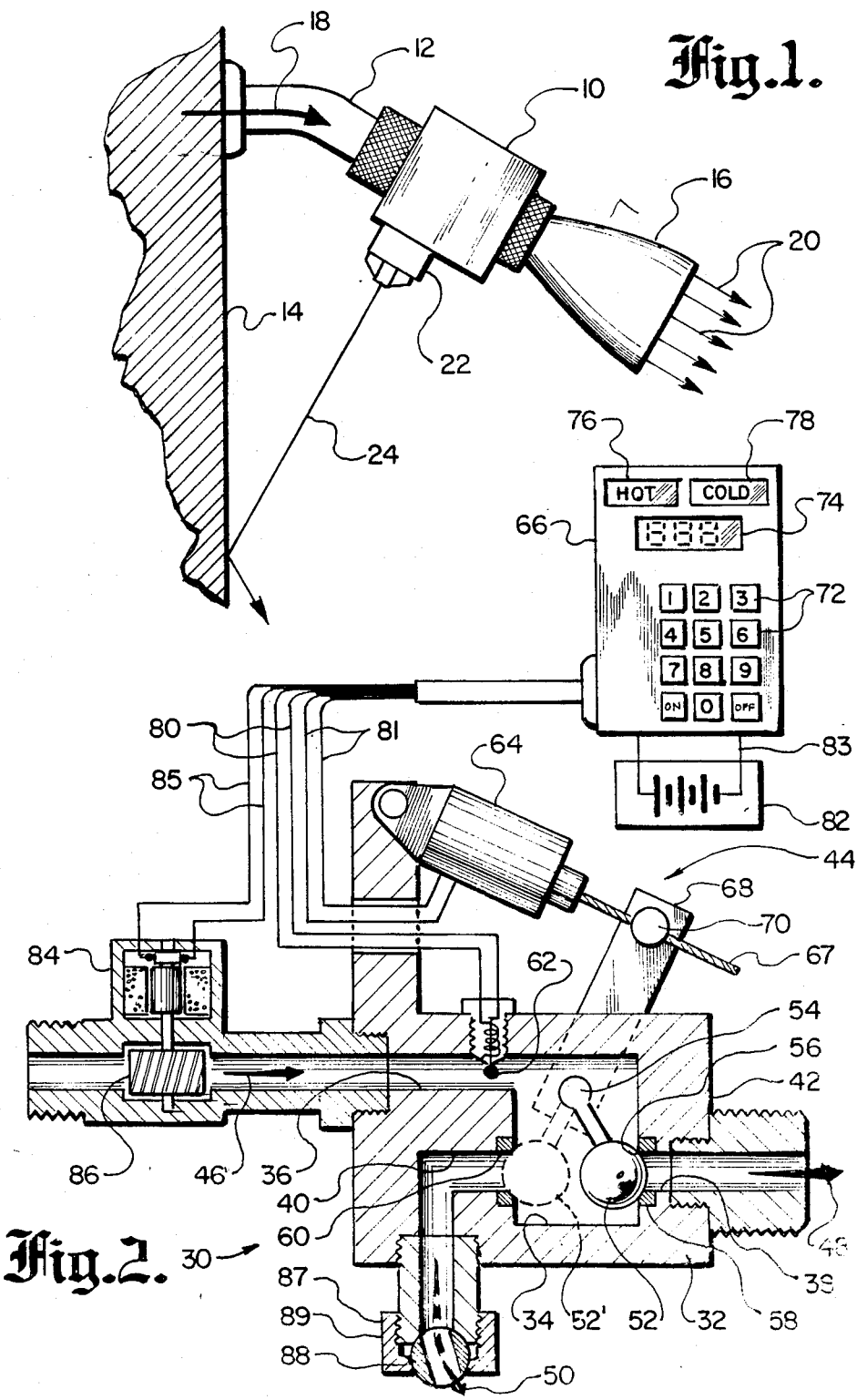

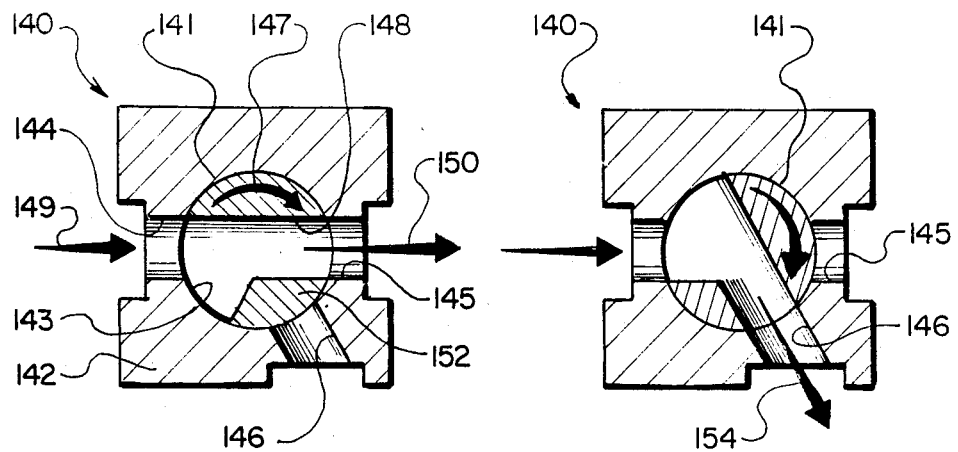
Fig.5. Fig.6.
Fig.7.
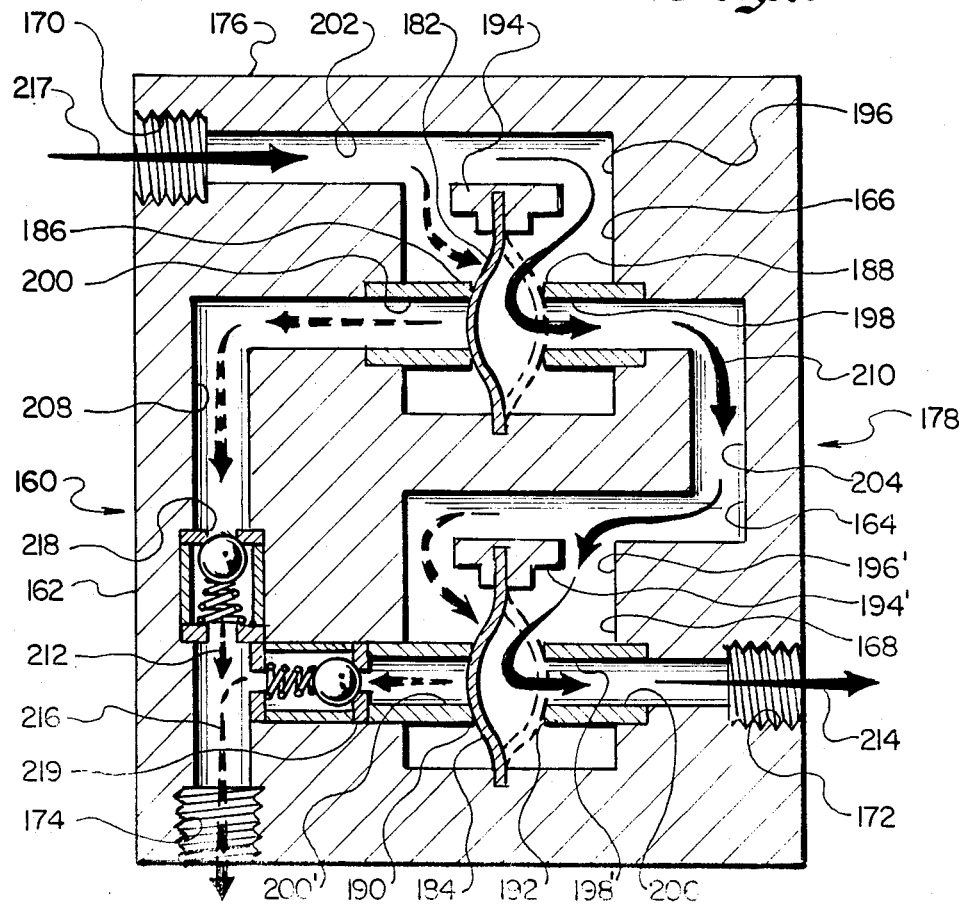

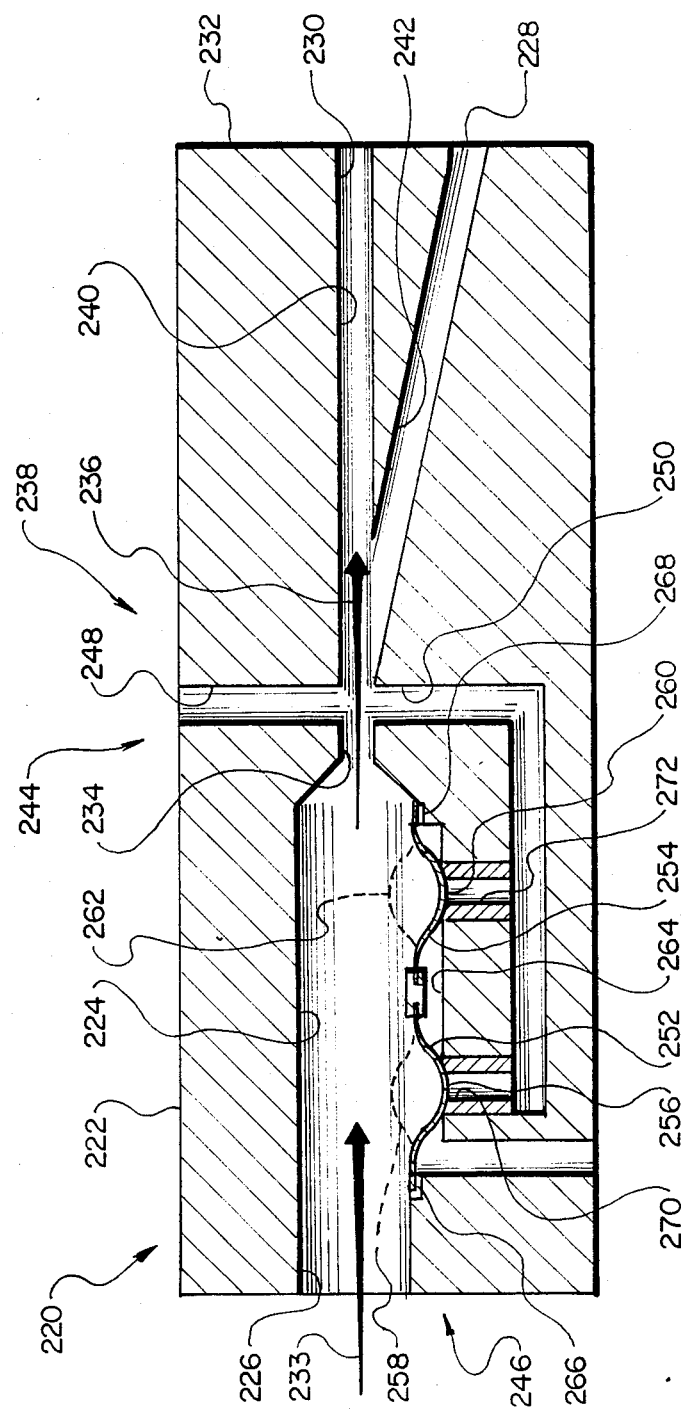

TEMPERATURE SENSITIVE SHOWER DIVERTER VALVE AND METHOD FOR DIVERTING SHOWER WATER

This is a continuation of co-pending application Ser. No. 807,861 filed Dec. 11, 1985 now abandoned.

BACKGROUND OF THE INVENTION

1. Field of the Invention

The present invention pertains to the water valve art, and more particularly, to a temperature sensitive shower diverter valve that diverts the water from a bather when the temperature of the water is too hot or too cold and automatically resets when water of the proper temperature arrives.

2. Background Art

When a shower is first turned on by a bather, the temperature of the water is usually unsatisfactory. The water in the hot water pipe leading to the shower mixer valves and the water in the pipe from the mixer valves to the shower head is cold. This water must be allowed to run from the system in order to obtain heated water through the hot water pipe. When the hot water finally arrives, the temperature of the water leaving the shower head is often too hot. The bather knows from prior experience that this is the usual procedure and therefore carefully stands to the side of the shower spray to adjust the temperature of the water by turning the shower water mixer valves until the desired temperature is achieved.

Even after the desired temperature is achieved, the temperature of the water may fluctuate during the course of a shower. A sudden drop in either cold or hot water pressure elsewhere in the system such as caused by the flushing of a toilet, the operation of a washing machine, or the start of another shower can rapidly change the temperature of the water. The problem is little more than an inconvenience for agile bathers who can accomodate to the changes by jumping from the spray and readjusting the mixer valves. The problem is more serious for less adept bathers who may be sprayed with freezing or scalding water that can actually injure the skin, cause falls, or create other health problems.

Several devices have been developed that address the problem by automatically adjusting the mixer valves. This approach is generally expensive requiring elaborate installations into the existing system inside the walls. In addition, the automatic mixer valve systems do not solve the initial problem of controlling a cold water spray at the start of a shower. Another approach is disclosed in U.S. Pat. No. 4,281,790 issued to Merrill F. McGinnis and provides a mechanical thermostatic valve at the shower head. The valve stops the flow of water out of the shower head when the water is too hot but does not provide any protection from cold water. Once activated, the McGinnis valve stops the bather from taking or completing a shower. In order to reset the valve, the bather must push a relief valve releasing the hot water from the thermostat and then wait while the valve cools down before the thermostat reopens to restart the shower spray.

SUMMARY OF THE INVENTION

The temperature sensitive shower diverter valve and method of the present invention include a housing with an internal cavity, an inlet port adapted to be connected to a source of shower water, a first outlet port adapted to be connected to a shower head, and a second outlet port positioned to divert the water to a wall. A temperature sensitive directing means directs water entering the inlet port to the first outlet port when the temperature of the water is within a range between first and second temperatures and directs the water to the second outlet port when the temperature of the water is outside of the range.

The diverter valve is installed between the wall outlet pipe and the shower head. No expensive modification to the piping system inside the wall is require. By diverting the water to spray against the wall when the temperature of the water is unsatisfactory, the passage of water through the mixer valves in the wall continues uninterrupted allowing the system to purge rapidly. At the start of a shower, the cooled water in the hot water supply line is eliminated rapidly. When the heated water reaches the diverter valve, the temperature rise is immediately sensed causing the diverter valve to reset automatically and deliver the water to the shower head. Similarly, when pressure changes occur in the source of shower water creating unsatisfactory water temperature conditions, the diverter valve diverts the water to spray against the wall. The diversion continues without interrupting the water flow from the source to rapidly purge the system. The diverter valve resets automatically when water having the proper water temperature arrives.

The preferred embodiment of the present invention incorporates a rotary valve. The temperature sensitive directing means includes a valve element mounted for movement between first and second positions and means responsive to the water temperature for moving the valve element to the first position closing the second outlet port when the temperature is within the temperature range and for moving the valve element to the second position closing the first outlet port when the water temperature is outside of the range. One of the features of the preferred embodiment is a valve element having a rotatable stem passing from the outside of the housing to the internal cavity and a closure means coupled to the stem. Another feature is a means responsive to the water temperature having a temperature sensor for measuring the temperature of the water, an actuator means for rotating the stem to position the closure means, and a controller means for controlling the actuator means according to the temperature of the water as measured by the temperature sensor.

Another embodiment of the present invention incorporates a mechanical bimetallic valve controlled by two bimetallic elements. The hot bimetallic element changes from a first position to a second position at a first temperature and the cold bimetallic element changes from a first position to a second position at a second temperature. Only when the hot and cold bimetallic elements are both at the first position is the water mechanically directed to flow out the first outlet port to the shower head. When the position of either element is at the second position, the water is directed to flow out the second outlet port.

Another embodiment of the present invention incorporates a fluidic valve having a narrow passage in an internal cavity that creates a water jet nominally directed to exit the housing through either of the first and second outlet ports. A vacuum creation means allows a vacuum to be created on one side of the water jet to selectively divert the water jet to exit the housing through the other of the ports. The vacuum creation means is activated by a temperature sensitive vacuum control means according to the temperature of the water. The water is directed to the first outlet port and the shower head when the temperature is within a range between first and second temperatures and is directed to the second outlet port when the temperature is outside of the range.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a side elevational view of the temperature sensitive shower diverter valve of the present invention;

FIG. 2 is a sectional view of a rotary embodiment having a spherical closure means;

FIG. 5 is a sectional view of a rotary embodiment having a spool closure means;

FIG. 6 is a sectional view of the rotary embodiment of FIG. 5 with the spool closure means rotated to the diversion position;

FIG. 7 is a sectional view of a mechanical bimetallic embodiment of the present invention; and FIG. 8 is a sectional view of a fluidic embodiment of the present invention.

DESCRIPTION OF THE PREFERRED EMBODIMENTS

Figure 3:
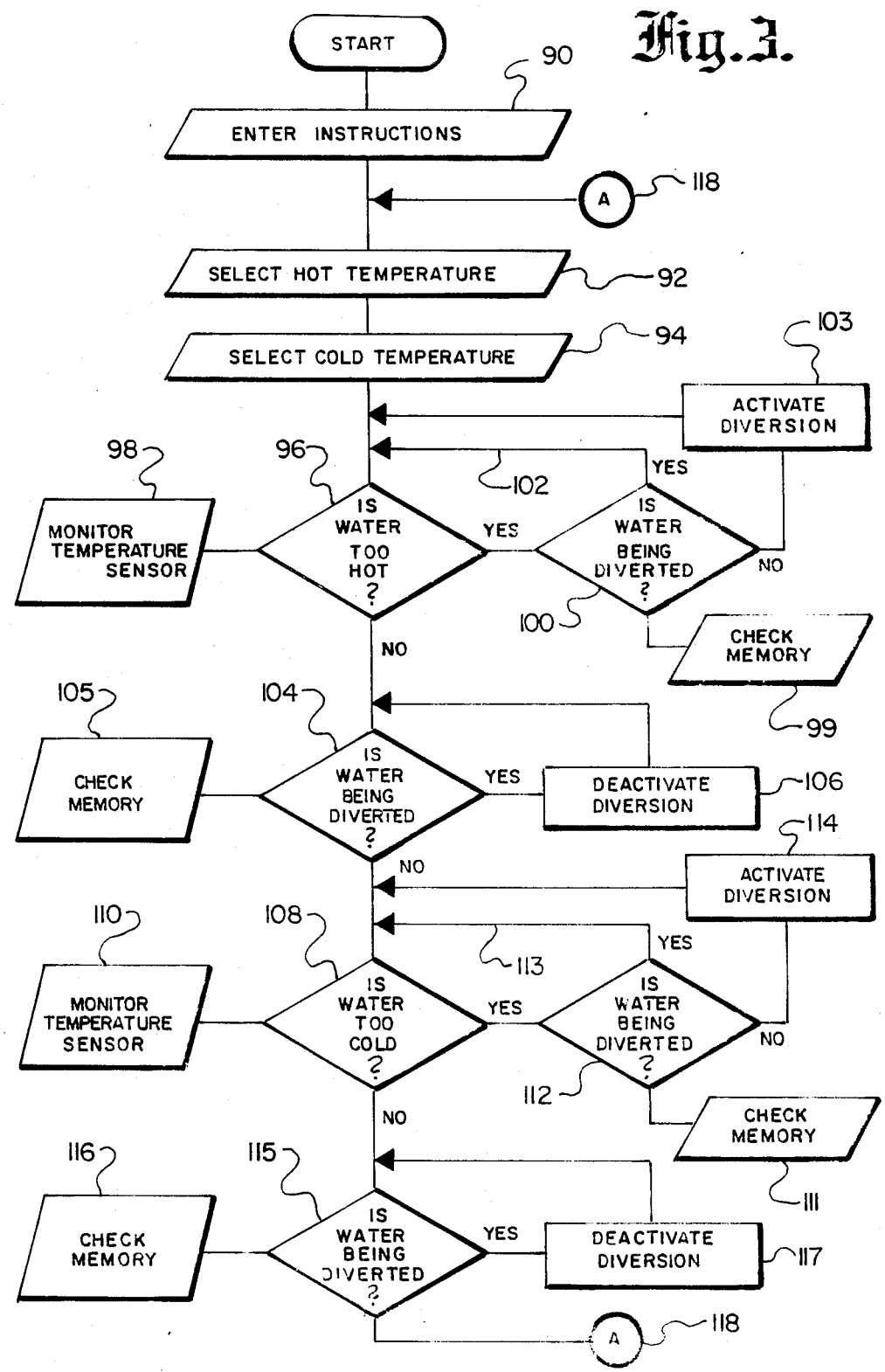
FIG. 3 is a flow chart depicting a signal processing methodology and structure in accordance with the principles of the present invention.

Referring initially to FIG. 1, there is illustrated a side elevational view of the temperature sensitive diverter valve, generally designated 10, in accordance with the present invention coupled between a wall outlet pipe 12 coming from a wall 14 and a shower head 16. The shower head 16 is normally connected directly to the source of shower water at the wall outlet pipe 12. Water is supplied to the wall outlet pipe 12 from hot and cold water mixer valves located in the wall 14. Installation of the diverter valve 10 requires only that the shower head 16 be removed from the wall outlet pipe 12, the diverter valve 10 installed on the wall outlet pipe 12, and the shower head 16 installed on the diverter valve 10. Water in the wall outlet pipe 12 indicated by the arrow 18 enters the diverter valve 10 and emerges either through the shower head 16 as indicated by the arrows 20 or through the diverter 22 as indicated by the arrow 24. When diverted, the water indicated by the arrow 24 splashes harmlessly against the wall 14 or a corner away from the bather who is normally positioned below the shower head 16. The bather can touch the diverted stream and decide what action to take.

FIG. 2 is a sectional view of a rotary embodiment, generally designated 30, of the present invention. A housing 32 defines an internal cavity 34 having an inlet port 36 for connection to the source of shower water, a first outlet port 38 for connection to a shower head, and a second outlet port 40. The inlet and first and second outlet ports 36, 38, and 40 pass from the outer surface 42 of the housing 32 to the internal cavity 34. A temperature sensitive directing means 44 directs the water entering the inlet port 36, indicated by the arrow 46, to the first outlet port 38, as indicated by the arrow 48, when the temperature of the water is within a range between first and second temperatures and directs the water to the second outlet port 40, as indicated by the arrow 50, when the temperature of the water is outside of the range.

The temperature sensitive directing means 44 includes a valve element 52 mounted for movement between first and second positions and a means responsive to the water temperature for moving the valve element 52 to the first position when the water temperature is within the temperature range and moving the valve element 52 to the second position when the water temperature is outside of the range. As shown in FIG. 2, the valve element 52 is located at the second position. A shadow outline of the valve element 52' is located at the first position.

The valve element 52 includes a rotatable stem 54 passing from the outer surface 42 to the internal cavity 34 and a closure means 56 coupled to the stem 54. The first and second outlet ports 38 and 40 have circular entrances 58 and 60, respectively, that seal with the spherical closure means 56. The location of the rotatable stem 54 equidistant from the entrances 58 and 60 insures the closing of the outlet ports 38 and 40 when the closure means 56 is moved from one to the other. When the valve element 52 is positioned to close the first outlet port 38 leading to the shower head, all of the water entering the internal cavity 34 is forced to leave through the second outlet port 40 and be diverted. When the valve element 52' is positioned to close the second outlet port 40, all of the water entering the internal cavity 34 is forced to leave through the first outlet port 38 to the shower head.

The means responsive to the water temperature for moving the valve element 52 includes a temperature sensor 62 for measuring the temperature of the water, an actuator means 64 for rotating the stem 54 to position the closure means 56, and a controller means 66 for controlling the actuator means 64 according to the temperature of the water measured by the temperature sensor 62. The temperature sensor 62 may be either a thermistor or a variable resistor. Both are capable of translating temperature into an electronic parameter such as voltage. The actuator means 64 may be either a solenoid or a rotary electric motor. If the actuator means 64 in FIG. 2 is a solenoid, the solenoid pushes or pulls the shaft 67 thereby pushing or pulling the lever 68 to rotate the rotatable stem 54. If the actuator means 64 is a rotary electric motor, the shaft 67 has screw threads that turn in a threaded nut 70 on the lever 68. When the rotary electric motor actuator means 64 rotates one way, the threaded nut 70 is drawn toward the motor moving the valve element 52 to a second position in front of the fi-st outlet port 38. When the motor rotates the opposite direction, the threaded nut 70 is pushed away from the motor moving the valve element 52' to a first position in front of the second outlet port 40.

The controller means 66 in FIG. 2 is a microprocessor having a keypad 72, a temperature display 74, and warning lights 76 and 78. The keypad 72 provides a temperature adjustment means for the bather to enter first and second water temperatures to create a water temperature range which is acceptable. The first temperature is a hot water temperature limit and the second temperature is a cold water temperature limit. The digital temperature display 74 indicates the present temperature at the temperature sensor 62 allowing the bather to better determine the desired level. When the measured temperature is greater than the first predetermined hot temperature or less than the second predetermined cold temperature, the warning lights 76 and 78 flash a visual signal to the bather.

Inputs for the operation of the microprocessor controller means 66 include the keypad 72 for entering the desired predetermined hot and cold temperatures, the temperature sensor 62 through wires 80 for entering the actual present water temperature, and the actuator means 64 through wires 81 for determining the present position of the valve element 52. When the microprocessor controller means 66 determines that under the present temperature conditions the valve element 52 should be moved, current is supplied through the wires 81 to operature the actuator means 64. When the actuator means 64 moves the valve element 52 to the desired position, the closure means 56 hits either the first or second outlet ports 38 or 40 causing the actuator means 64 to stall thus increasing the actuator means drive current. The increase in the drive current provides a feedback signal to the microprocessor controller means 66 that is utilized to deactivate the actuator means 64. The occurrence of the current increase is stored in the memory of the microprocessor controller means 66 for use in the future to identify the position of the valve element 52 as discussed more fully below in conjunction with FIG. 3.

Power for the operation of the rotary diverter valve 30 is provided by a battery 82 through wires 83 and may include a generator 84 through wires 85 powered by a turbine 86 in the water flow. The combination of a rechargeable battery 82 and the generator 84 allows the rotary embodiment 30 to be completely self-contained and operate over long periods of time without replacement of the battery 82. Alternatively, the battery 82 may be replaced by a capacitor at the same location. It will be appreciated that line electrical power may also be utilized. However, a rotary diverter valve 30 with battery power is significantly less expensive to install and is safer because of the low voltage levels.

At the bottom of FIG. 2 is a diverter 87 fitted into the second outlet port 40. The diverter 87 has an adjustable angle fitting 88 that may be turned to optimally position the impinging angle of the water on the wall or a corner and then locked into place by a nut 89.

FIG. 3 is a flow chart depicting a signal processing methodology and structure in accordance with the principles of the present invention performed by the microprocessor controller means 66 illustrated in FIGURE 2. The process is initiated by the entry of a set of instructions (input block 90) for operation of the temperature sensitive shower diverter valve 30. The bather then selects a hot temperature (input block 92) and a cold temperature (input block 94) by means of the keypad 74 or defaults to the previous hot and cold temperatures held in the memory of the microprocessor controller means 66.

The first test performed by the microprocessor controller means 66 is to determine if the water temperature entering the diverter valve 30 exceeds the predetermined hot temperature (test block 96). A sample (input block 98) of the electrical signals produced by the temperature sensor 62 is compared to the predetermined hot temperature. If the measured temperature exceeds the predetermined hot temperature, a second test is made checking the memory (input block 99) to identify the present position of the valve element 52 to determine whether the water is presently being diverted from the shower head (test block 100). As discussed above in conjunction with FIG. 2, an electrical current increase occurs when the valve element 52 hits either of the outlet ports 38 or 40. The occurrence of the current increase is stored in the memory for use to identify the position of the valve element 52. If the water is being presently diverted, the two tests (96 and 100) are repeated indefinitely as indicated by the loop 102 until the measured temperature is less than the predetermined hot temperature. If the water is not being presently diverted, the controller means 66 instructs the actuator means 64 (process block 103) to move the valve element 52 to the first outlet port 38 as shown in FIG. 2 diverting the water flow from the shower head to the second outlet port 40.

If the measured water temperature (input block 98) is less than the predetermined hot temperature (test block 96), the process proceeds to determine if the water is being diverted (test block 104) by checking the memory (input block 105). If the water is being diverted, the microprocessor controller means 66 instructs the actuator means 64 (process block 106) to move the valve element 52' to the second outlet port 40 stopping the flow out of the diverter 87 and into the first outlet port 38 to the shower head.

If the water is not being diverted, the next test in the sequence is to determine if the water entering the diverter valve 30 has a temperature less than the predetermined cold temperature (test block 108). A sample (input block 110) of the electrical signals produced by the temperature sensor 62 is compared to the predetermined cold temperature. If the measured temperature is less than the predetermined cold temperature, another test is made checking the memory (input block 111) to determine whether the water is presently being diverted from the shower head (test block 112). If the water is being presently diverted, the two tests (108 and 112) are repeated indefinitely as indicated by the loop 113 until the measured temperature is greater than the predetermined cold temperature. If the water is not being presently diverted, the microprocessor controller means 66 instructs the actuator means 64 (process block 114) to move the valve element 52 to the first outlet port 38 as shown in FIG. 2 diverting the water flow from the shower head to the second outlet port 40.

If the measured water temperature (input block 110) is greater than the predetermined cold temperature (test block 108), the process proceeds to determine if the water is being diverted (test block 115) by checking the memory (input block 116). If the water is being diverted, the microprocessor controller means 66 instructs the actuator means 64 (process block 117) to move the valve element 52' to the second outlet port 40 stopping the flow out of the diverter 87 and into the first outlet port 40 to the shower head.

When the last operation is completed, the program loops back (loop 118) to start the entire process over. The process never ends as long as the diverter valve 30 is turned on. In this manner, the operation of the diverter valve 30 continuously monitors and changes according to the temperature of the water entering the diverter valve 30.

Figure 4:
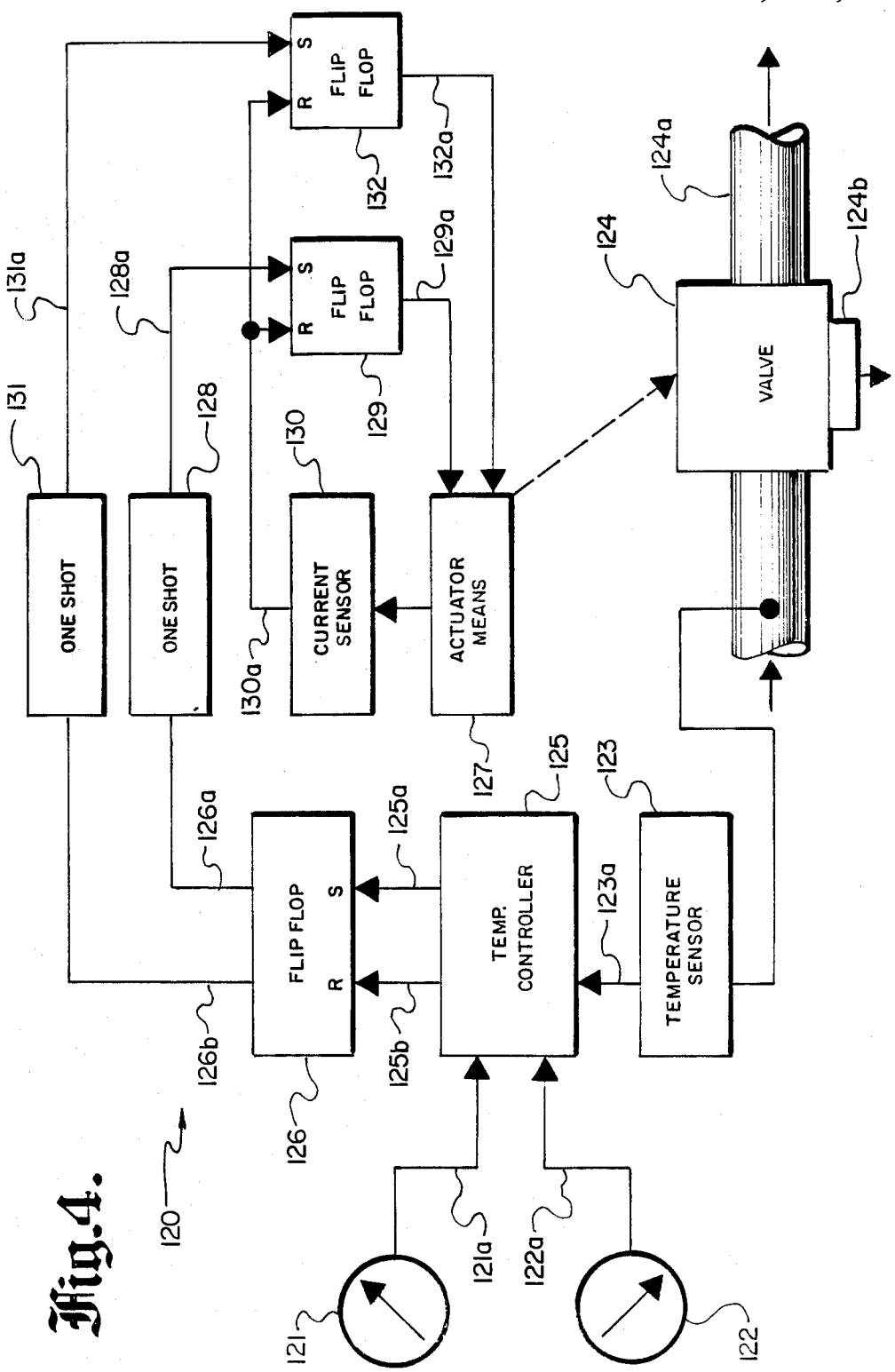
FIG. 4 is block diagram of an alternative controller means embodiment.

FIG. 4 is a block diagram of an alternative controller means embodiment 120 in accordance with the present invention. Temperature adjustment means 121 and 122 are initially manually adjusted to desired hot and cold temperatures to provide set point signals 121a and 122a, respectively. The temperature sensor 123 measures the actual temperature of the water entering the diverter valve 124 and supplies a temperature output signal 123a. The temperature controller 125 compares the hot and the cold temperature set point signals 121a and 122a to the actual temperature output signal 123a.

If the actual temperature of the water is between the predetermined hot and cold temperatures, the temperature controller 125 sends in in-range signal 125a to set flip flop 126 to order the diverter valve 124 to direct the water to the first outlet port 124a. If the actual temperature of the water is above the predetermined hot temperature or below the predetermined cold temperature, the temperature controller 125 sends an out-of-range signal 125b to reset flip flop 126 to order the diverter valve 124 to direct the water to the second outlet port 124b.

The position of the diverter valve 124 is controlled by actuator means 127 which responds to the state of flip flop 126. When set, flip flop 126 sends a signal 126a to one shot circuit 128 which outputs pulse 128a. The pulse 128a sets flip flop 129 to provide signal 129a to cause actuator means 127 to move the diverter valve 124 into the position directing the water to the first outlet port 124a. When the valve 124 reaches this position or if the valve 124 is already in this position, the actuator means 127 stalls thus increasing the actuator means drive current. A current sensor 130 senses the current increase and sends a feedback signal 130a to reset flip flop 129 to deactivate actuator means 127. Conversely, when reset, flip flop 126 sends a signal 126b to one shot circuit 131 which outputs pulse 131a. The pulse 131a sets flip flop 132 to provide signal 132a to the actuator means 127 to move the diverter valve 124 to the position directing the water to the second outlet port 124b. When the valve 124 reaches this position or if the valve 124 is already in this position, the actuator means 127 stalls causing a current increase. The current sensor 130 senses the current increase and sends a feedback signal 130a to reset flip flop 132 and deactivate actuator means 127.

FIG. 5 is a sectional view of a portion of another rotary embodiment of the temperature sensitive shower diverter valve, generally designated 140, having a spool closure means 141 instead of the spherical closure means 56 illustrated in FIG. 2. The diverter valve 140 has a housing 142 with an internal cavity 143, an inlet port 144, a first outlet port 145 connected to a shower head, and a second outlet port 146. The spool closure means 141 rotates in the internal cavity 143 as indicated by the arrow 147. A spool port 148 passes through the center of the spool closure means 141 allowing water to pass through the center. Water enters the internal cavity 143 through the inlet port 144 as indicated by the arrow 149. When the water has a temperature within a range between first and second temperatures, the water passes straight through the spool port 148 and out the first outlet port 145 to the shower head as indicated by the arrow 150. A portion 152 of the spool closure means 141 closes the second outlet port 146. The remainder of the components of the diverter valve 140 are the same as the rotary diverter valve 30 illustrated in FIG. 2.

FIG. 6 is a sectional view of the rotary embodiment of the diverter valve 130 of FIG. 5 with the spool closure means 141 rotated to close the first outlet port 145. When the water has a temperature above the first temperature or below the second temperature, the water exits the second outlet port 146 as indicated by the arrow 154 instead of the first outlet port 145 as shown in FIG. 5.

FIG. 7 is a sectional view of a mechanical bimetallic embodiment of the temperature sensitive shower diverter valve, generally designated 160, of the present invention. A housing 162 contains an internal cavity 164 divided into first and second stage cavities 166 and 168. An inlet port 170 to the internal cavity 164 is connected to the source of shower water. A first outlet port 172 is connected to a shower head and a second outlet port 174 provides an outlet from the valve 160 for diverting the water from the shower head. The inlet and first and second outlet ports 170, 172, and 174 pass from the outer surface 176 of the housing 162 to the internal cavity 164.

A temperature sensitive directing means 178 directs the water entering the inlet port 170 to the first outlet port 172 when the temperature of the water is in a range between first and second temperatures. The temperature sensitive directing means 178 directs the water to the second outlet port 174 when the temperature of the water is outside of the range.

The temperature sensitive directing means 178 is based on hot and cold bimetallic elements in the form of disks 182 and 184. Both disks 182 and 184 have an outer edge in a plane and a central portion nominally curved away from the plane in either a first or second position and moving to the other position at a predetermined temperature. When viewed from one side, the disks 182 and 184 are convex and then snap to a concave configuration at the predetermined temperature. The hot disk 182 changes from a first position 186 to a second position 188 indicated by the dotted line at the first predetermined hot temperature. The cold disk 184 changes from a first position 190 to a second position 192 indicated by the dotted line at the second predetermined cold temperature.

One of the disks 182 and 184 is mounted in each of the first and second stage cavities 166 and 168. In FIG. 7 the hot disk 182 is mounted in the first stage cavity 166 and the cold disk 184 is mounted in the second stage cavity 168. It will be appreciated that the location of the hot disk 182 and the cold disk 184 may be interchanged between the first and second stage cavities 166 and 168 as desired. The cavities 166 and 168 are arranged in series with the final result being the same whether the hot disk 182 comes before or after the cold disk 184.

Each of the first and second stage cavities 166 and 168 has a disk seat 194, 194' holding a disk 182, 184; a disk inlet port 196, 196' allowing water to flow on both sides of the disk; a first disk outlet port 198, 198' located on one side of the disk along the axis of the disk; and a second disk outlet port 200, 200' located on the other side of the disk along the axis of the disk.

A valve supply passage 202 passes from the valve inlet port 170 to the disk inlet port 196 of the first stage cavity 166. An inter-stage passage 204 passes from the first disk outlet port 198 of the first stage cavity 166 to the disk inlet port 196' of the second stage cavity 168. A shower head passage 206 passes from the first disk outlet port 198' of the second stage cavity 168 to the first outlet port 172. A diverter passage 208 passes from both of the second disk outlet ports 200 and 200' to the second outlet port 174.

Operation of the diverter valve 160 is entirely automatic depending upon the temperature of the water entering the valve 160 and the resulting mechanical positions of the disks 182 and 184. The positioning of the hot disk 182 in the first stage cavity 166 at the first position 186 seals the hot disk 182 against the second disk outlet port 200 forcing the water in the first stage cavity 166 to exit through the first disk outlet port 198 and into the inter-stage passage 204 as indicated by the arrow 210. The positioning of the hot disk 182 at the second position 188 indicated by the dotted line seals the disk 182 against the first disk outlet port 198 forcing the water in the first stage cavity 166 to exit through the second disk outlet port 200 and out of the valve 160 through the diverter passage 208 as indicated by the arrow 212.

The positioning of the cold disk 184 in the second stage cavity 168 at the first position 190 seals the disk 184 against tee second disk outlet port 200' forcing the water in the second stage cavity 168 to exit through the first disk outlet port 198' and out of the valve 160 through the shower head passage 206 as indicated by the arrow 214. The positioning of the cold disk 184 at the second position 192 seals the disk 184 against the first disk outlet port 198' forcing the water in the second stage cavity 168 to exit through the second disk outlet port 200' and out of the valve 160 through the diverter passage 208 as indicated by the arrow 216. Only when both of the hot and cold disks 182 and 184 are positioned at the first positions 186 and 190, respectively, against the second disk outlet ports 200 and 200' does the water entering the valve 160 indicated by the arrow 217 flow out of the valve to the shower head as indicated by the arrow 214. This situation only occurs when the temperature of the water is within the range between the first and second temperatures. One way valves 218 and 219 prevent the back flow of water between the first and second stage cavities 166 and 168 when one of the disks 182, 184 is in the second position 188, 192.

FIG. 8 is a sectional view of a fluidic embodiment of the temperature sensitive shower diverter valve, generally designated 220, of the present invention. A housing 222 contains an internal cavity 224, an inlet port 226 connected to the source of shower water, a first outlet port 228 connected to a shower head, and a second outlet port 230. The inlet, first and second outlet ports 226, 228, and 230 pass from the outer surface 232 of the housing 222 to the internal cavity 224. Water enters the valve 220 through the inlet port 226 as indicated by an arrow 233 passing to the internal cavity 224 where a narrow passage 234 produces a water jet 236 indicated by an arrow.

A temperature sensitive directing means 238 directs the water jet 236 to exit the housing 222 through either the first or the second outlet port 228, 230, depending upon the temperature of the water. The first outlet port 228 receives the water if the water has a temperature within a range between first and second temperatures. The second outlet port 230 receives the water for diversion from the bather if the temperature of the water is outside of the range.

In a fluidic valve, the axis of the water jet is identical to the axis of the narrow passage creating the water jet. After the water jet has exited the narrow passage, air is present on all sides of the jet. The rushing water drags some of the air molecules adjacent the jet along the direction of the jet creating an air current. The moving air has an air pressure lower than the surrounding still air as explained by Bernoulli's law resulting in the creation of a slight vacuum adjacent the water jet. Some of the still air further out from the water jet rushed toward the jet to fill the vacuum in a continuing process. As long as the air is allowed to rush equally to fill the vacuum on all sides of the water jet, the jet continues to shoot along the axis of the narrow passage (effected only by gravity which is not significant over a short distance). However, when air is not allow to rush to fill the vacuum on one side of the water jet, the jet turns slightly toward the side having the increased vacuum.

The operation of the diverter valve 220 is based upon these fluidic valve principles. The internal cavity 224 has a diverter passage 240 after the narrow passage 234 that is slightly larger than the water jet 236 and leads to the second outlet port 230. The internal cavity 224 also has a shower head passage 242 angled from the axis of the narrow passage 234 and the diverter passage 240 leading to the first outlet port 228 and the shower head.

The temperature sensitive directing means 238 controls the direction of the flow of the water jet 236 into either the diverter passage 240 or the shower head passage 242 and includes a vacuum creation means 244 and a temperature sensitive vacuum control means 246. The vacuum creation means 244 includes a free air passage 248 and a control air passage 250 between the internal cavity 224 and the outer surface 232 of the housing 222. The free air passage 248 is positioned perpendicular to the location of the water jet 236 before, and in the plane of, the diverter and shower head passages 240 and 242. The control air passage 250 is positioned on the opposite side of the location of the water jet 236 from the free air passage 248 in the same plane and having the same axis as the free air passage 248. The free air passage 248 always allows air to rush into the water jet 236 from the atmosphere and fill the vacuum on the top of the jet. The control air passage 250 may be selectively closed and only allows air from the atmosphere to pass and fill the vacuum on the bottom of the water jet 236 when the temperature of the water exceeds the predetermined hot temperature or is less than the predetermined cold temperature. When the air rushes to fill the vacuum adjacent the bottom of the water jet 236, the vacuum level on the bottom of the jet balances the vacuum level across the jet at the free air passage 248. The water jet 236 then shoots straight ahead into the diverter passage 240. When the control air passage 250 is closed, the vacuum on the bottom of the water jet 236 at the control air passage 250 is not filled. The water jet 236 is then deflected slightly toward the relatively increased vacuum on the bottom of the jet and into the shower head passage 242.

The vacuum creation means 244 is controlled by the vacuum control means 246. Like the previous embodiment illustrated in FIG. 7, the vacuum control means 246 is based on hot and cold bimetallic elements in the form of disks 252 and 254, respectively, that change from a first position to a second position at the predetermined hot and cold temperatures. Both disks 252 and 254 have an outer edge in a plane and a central portion nominally curved away from the plane in either a first or second position and moving to the other position at a predetermined temperature. The hot disk 252 changes from a first position 256 to a second position 258 indicated by the dotted line at the first predetermined hot temperature. The cold disk 254 changes from a first position 260 to a second position 262 indicated by the dotted line at the second predetermined cold temperature. It will be appreciated that a bellows operating against a sealed gas chamber to respond to changes in the water temperature may be utilized instead of the bimetallic elements.

The hot and cold disks 252 and 254 are mounted between the internal cavity 224 and a control cavity 264 in the control air passage 250 in disk seats 266 and 268. The disks 252 and 254 have one side in the internal cavity 224 and the other side in the control cavity 264 sealing the control cavity 264 from the internal cavity 224. Water in the internal cavity 224 is therefore in contact with the disks 252 and 254 allowing the bimetallic disks to respond rapidly to changes in water temperature. Each disk 252 and 254 has a disk outlet port 270, 272 located on the control cavity side of the disk an connected to the control air passage 250 leading to the water jet 236. The control cavity 264 outside the disk outlet ports 270 and 272 is connected to the control air passage 250 leading outside the housing 222 to the atmospheric air.

Operation of the diverter valve 220 is entirely automatic depending upon the temperature of the water entering the valve 220 and the resulting positions of the disks 252 and 254. The positioning of both of the disks 252 and 254 in the first positions 256 and 260 against the disk outlet ports 270 and 272 blocks the passage of air through the control air passage 242 allowing the vacuum to increase on the bottom side of the water jet 236 and resulting in the bending of the water jet into the shower head passage 246. The bimetallic disks 252 and 254 are only in the first positions 256 and 260 when the temperature of the water is within the range between the first and second temperatures. The positioning of a disk 252, 254 in the second position 258, 262 away from the disk outlet port 270, 272 allows air to pass through the control cavity 264 and into the control air passage 250 leading to the water jet 236 returning the jet to the diverter passage 240. The hot bimetallic disks 252 is only in the second position 258 when the temperature of the water is greater than the first predetermined hot temperature. The cold bimetallic disk 254 is only in the second position 262 when the temperature of the water is less than the second predetermined cold temperature. In this manner, the fluidic embodiment of the temperature sensitive shower diverter valve 220 automatically protects the bather from excessively hot or cold water by diverting the water to the wall or a corner of the shower.

It will be appreciated that the valves and method of the present invention may be utilized for controlling the flow of any fluid in addition to water according to the temperature of the fluid. Also, the valves and method may be utilized in situations where the fluid is diverted only when the temperature of the fluid is greater than a predetermined temperature, or, alternatively, only when the temperature of the fluid is less than the predetermined temperature.

In view of the above, it may be seen that temperature sensitive shower diverter valves are provided that are installed between the source of shower water and the shower head to automatically divert the flow of water from the shower head when the water is too hot or too cold to a second outlet directed against the wall or a corner and away from the bather. The diverter valves allow the water to continue flowing thereby purging the supply system until water having the proper temperature arrives at which time the valves automatically reset to delivering the water to the shower head. Of course, the structure and method may be variously implemented and variously used depending upon specific applications. Accordingly, the scope hereof shall not be referenced to the disclosed embodiments, but on the contrary, shall be determined in accordance with the claims as set forth below.

I claim:

1. A diverter valve means for coupling a wall outlet pipe to a shower head, comprising:

a housing defining an internal cavity, an inlet port for connecting to the wall outlet pipe, a first outlet port having a circular entrance from the lateral cavity for connecting to the shower head, a second outlet port having circular entrance from the lateral cavity having the same axis as the first outlet port, and the inlet and first and second outlet ports passing form an outer surface of the housing to the internal cavity;

temperature sensitive directing means for directing the water entering the inlet port to the first outlet port when the temperature of the water is within a range between first and second temperature and for directing the water to the second outlet port when the temperature of the water is outside of the range, the temperature sensitive directing means including:

a rotatable stem passing from the outer surface of the housing to the internal cavity, the axis of the rotational stem mounted equidistant from the entrances of the first and second outlet ports;

a spherical closure means coupled to the stem between the first and second outlet ports for selectively closing one of the first and second outlet ports;

electric motor actuator means for rotating the stem to position the closure means;

a temperature sensor capable of translating the temperature of the water into an electronic parameter; and controller means for controlling the actuator means according to the electronic parameter produced by the temperature sensor;

whereby the positioning of the spherical closure means at the entrance to the first outlet port directs the water to the second outlet port and the positioning of the spherical closure means at the entrance to the second outlet port directs the water to the first outlet port.

2. The diverter valve means according to claim 1 wherein the controller means is a microprocessor.

3. The diverter valve means according to claim 2 wherein the controller means further includes temperature adjustment means for varying the levels of the predetermined hot and cold temperatures.

4. The diverter valve means according to claim 3 further including a temperature display.

5. The diverter valve means according to claim 4 wherein the temperature display is digital.

6. The diverter valve means according to claim 2 wherein the controller means senses the increase in the current demanded by the electric motor actuator means when the closure means hits one of the first and second outlet ports causing the electric motor actuator means to stall, turns off the electric motor actuator means, and records the occurrence of the current increase for future use to identify the position of the spherical closure means.

7. A diverter valve useful for coupling a water supply pipe to a shower head for permitting only water having a temperature within a range between T1 and T2 to flow through said shower head, said diverter valve comprising:
- a housing having a threaded inlet port adapted to be threadedly coupled to said supply pipe, a first outlet port adapted to be coupled to said shower head, and a second outlet port;
- valve means in said housing for selectively defining either a first state in which said first outlet port is open and said second outlet port is closed or a second state in which said first outlet port is closed and said second outlet port is open, said valve means including a single valve element mounted for movement between a first position closing said second outlet port and a second position closing said first outlet port;
- electrically energizable mover means in said housing for moving said valve means to either said first or second state;
- temperature sensing means in said housing for determining whether water supplied to said inlet port has a temperature within said range between T1 and T2;
- battery means for supplying electrical energy;
- control means responsive to said temperature sensing means determining that said supplied water is outside of said range for connecting said battery means to said mover means to cause said valve means to define said second state and responsive to said temperature sensing means determining that said supplied water is within said range for connecting said battery means to said mover means to cause said valve means to define said first state;
- an elongated stem having first and second ends;
- means mounting said stem for pivotal movement about a point intermediate said first and second ends; and wherein
- said valve element is mounted on said stem second end.

8. The diverter valve of claim 7 wherein said mover means comprises a motor having a rotatable threaded shaft;
- a threaded nut mounted on said stem first end; and wherein
- said shaft is threadedly engaged in said nut.

9. The diverter valve of claim 7 including generator means mounted in said housing and responsive to water flow into said inlet port for supplying charging current to said battery means.

10. A diverter valve useful for coupling a water supply pipe to a shower head for permitting only water having a temperature within a range between T1 and T2 to flow through said shower head, said diverter valve comprising:
- a housing having a threaded inlet port adapted to be threadedly coupled to said supply pipe, a first outlet port adapted to be coupled to said shower head, and a second outlet port;
- valve means in said housing for selectively defining either a first state in which said first outlet port is open and said second outlet port is closed or a second state in which said first outlet port is closed and said second outlet port is open;
- electrically energizable mover means in said housing for moving said valve means to either said first or second state;
- temperature sensing means in said housing for determining whether water supplied to said inlet port has a temperature within said range between T1 and T2;
- battery means for supplying electrical energy;
- control means responsive to said temperature sensing means determining that said supplied water is outside of said range for connecting said battery means to said mover means to cause said valve means to define said second state and responsive to said temperature sensing means determining that said supplied water is within said range for connecting said battery means to said mover means to cause said valve means to define said first state; and
- generator means mounted in said housing and responsive to water flow into said inlet port for supplying charging current to said battery means.

* * * * *